July 19, 1932.  J. P. CROWLEY  1,868,275
GLASS SURFACING MACHINE
Filed Aug. 28, 1925
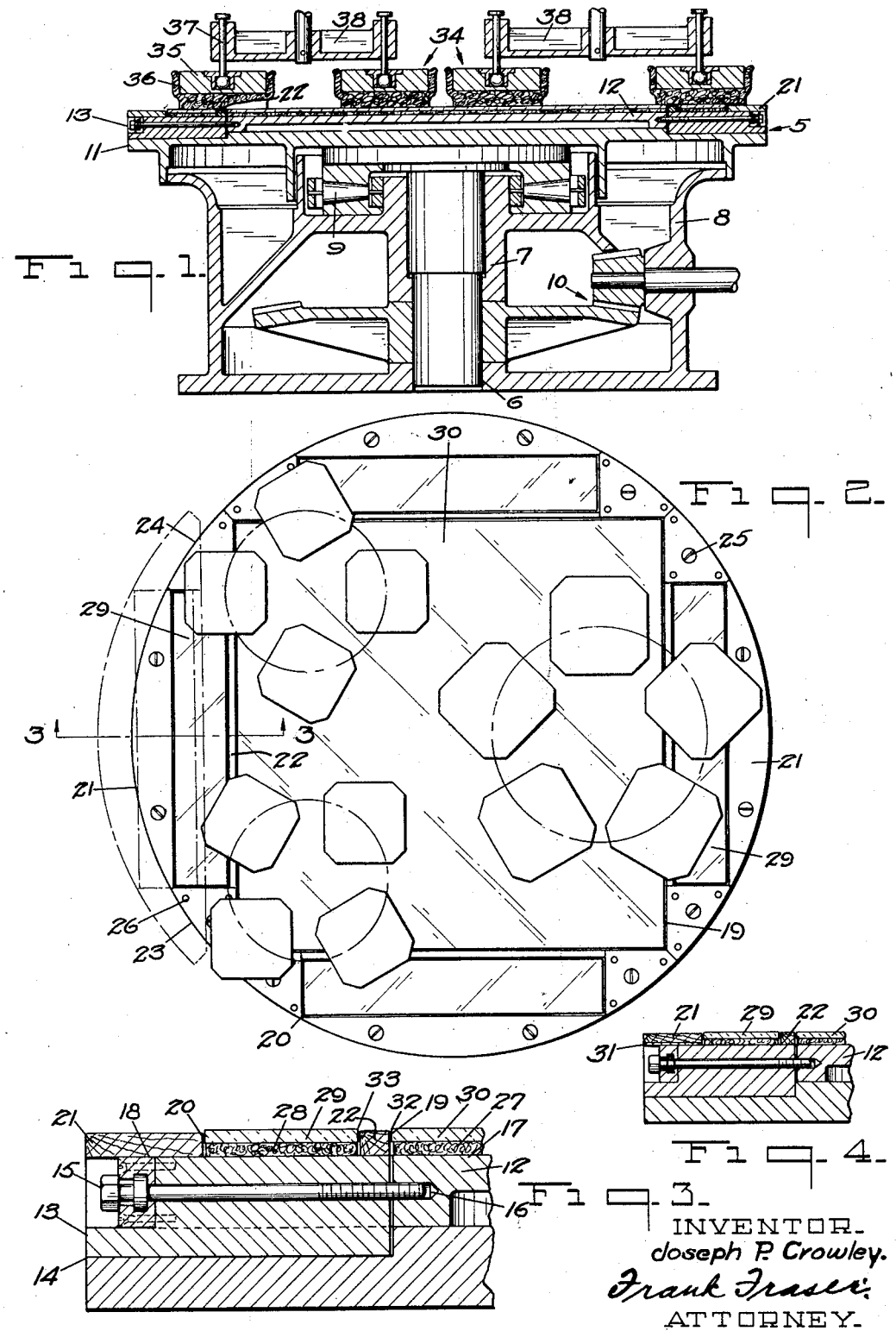
INVENTOR.
Joseph P. Crowley.
Frank Fraser
ATTORNEY.

Patented July 19, 1932

1,868,275

UNITED STATES PATENT OFFICE

JOSEPH P. CROWLEY, OF TOLEDO, OHIO, ASSIGNOR TO LIBBEY-OWENS-FORD GLASS COMPANY, OF TOLEDO, OHIO, A CORPORATION OF OHIO

GLASS SURFACING MACHINE

Application filed August 28, 1925. Serial No. 53,026.

This invention relates to an improved form of glass supporting table for use in glass surfacing apparatus.

An object of the present invention is to provide the upper surface of a glass supporting table with means to permit it to support a maximum amount of glass to be surfaced.

Another object of the present invention is to maintain as near as possible a continuous horizontal glass level slightly above the surface of the sheet supporting table so that the table top will not interfere with the surfacing of the glass.

Another object of the invention is to provide a method and an apparatus for surfacing glass sheets of various sizes.

A further object of the invention is to freely and individually support a plurality of glass sheets in a glass surfacing apparatus.

Other objects and advantages of this invention will become apparent from the following detailed description.

In the accompanying drawing,

Fig. 1 is a central vertical section through a polishing unit of a surfacing apparatus.

Fig. 2 is a plan view of the glass supporting table showing the polishing blocks diagrammatically arranged, Fig. 3 is an enlarged fragmental section taken on line 3—3 of Fig. 2, and Fig. 4 is a modification of Fig. 3.

The sheet supporting table 5 is mounted on the end of a vertical column 6 which freely rotates in bearing 7 arranged within the framework 8. The table is preferably mounted on roller bearings 9, and is driven by a set of bevel gears 10, connected to some convenient form of drive.

The sheet supporting table 5, of which this invention concerns, consists of a round platen 11, a preferably square sheet supporting member 12 secured centrally thereto, and surrounding this square sheet supporting member a plurality of adjustable sheet supporting segments 13. These segments are independently and slidably mounted on the dovetailed ways 14 arranged in the platen 11. The slidable segments are fitted with adjusting bolts 15 for in and out adjustment thereof. The bolts extend through the segments and are screw-threadedly mounted in tapped holes 16 in the square sheet supporting member. The sheet supporting members 12 and 13 are preferably constructed of heavy metal to be absolutely rigid and their upper surfaces are accurately machined to a true and common level. It is necessary that these surfaces 17 and 18 be substantially true and flat because they initially serve as "master surfaces" for producing perfect lights of plate glass. Defined upon these master surfaces are arranged, as shown in Fig. 2, a plurality of recesses, preferably one large central square recess 19 corresponding approximately in size to the square sheet supporting member, and four relatively smaller rectangular recesses 20 disposed on the sheet supporting segments. These recesses are formed, as shown in Fig. 2, by suitably arranging two side pieces 21 and 22 and two end pieces 23 and 24 made of wood or other suitable material, at the perimeter of the four segments and secured thereto by screws 25 and dowels 26. The inner edges of the side piece 21 and the end pieces 23 and 24 of each segment collectively form the central recess 19. Within the recesses 19 and 20, and securely or loosely laid on the master surfaces 17 and 18, are sheet supporting pads 27 and 28 of cork, felt or similar cushioning material. These pads should be substantially equal in thickness throughout so that the master surface thereunder will be correspondingly registered on the upper surface of the pads. The recess then consists of a cushioned or carpeted bottom and side walls of a non-metallic substance, and conforms to but slightly larger than the ground glass blanks 29 and 30 placed therein. The pads, the sides and end pieces of the recesses are of such thickness that the glass blanks resting freely therein will extend a few thousandths of an inch above the side and end pieces, as shown in Fig. 3.

It so occurs that the ground glass blanks sometimes vary in thickness. For this reason the side piece 21 and the end pieces 23 and 24 are made to accommodate the thinnest possible blanks. In order to provide for the thicker glass blanks, shims 31 are placed under the pieces 21, 23 and 24, as shown in Fig. 4. It is not necesary to shim up the side pieces 22 as they merely act as spacers between the sheet edges 32 and 33.

The polishing tools 34 are of the type ordinarily used in connection with polishing plate glass. Each tool consists of a heavy block 35 having secured to its lower face a felt pad 36. These blocks are pivotally mounted by the spindles 37 on a plurality of spiders 38 suitably arranged above the glass. When the spiders are in lowered position, these blocks rest at all times with their entire weight upon the glass surface. The blocks are of sufficient size to span the space occupied by piece 22 and therefore this piece does not engage the surface of the polishing block. The polishing tools are driven by their frictional engagement with the glass upon the exposed surface of the rotating table. If the frictional engagement of the tools with the glass is not sufficient to satisfactorily drive them, they may be positively driven by being connected to some convenient form of outside drive.

With this preferred form of glass supporting table all available space on the surface thereof is utilized in freely supporting the glass. This approaches an ideal condition for the surfacing tools, particularly in the case of the polishing tools.

During the polishing of sheet glass it is necessary that the felt pads on the polishing tools become evenly coated or caked with a layer of rouge to effectively polish the glass. The rouge is periodically applied to the glass surface at convenient locations. The polishing tools, continuously engaging a glass surface of substantially a common level, will then have little cause for the coating of rouge thereon to be unevenly removed. This form of supporting table also provides for an increased output of the surfacing apparatus.

It is to be understood that the table construction shown in the drawing is applicable to a grinding unit as well, which is identical in design except for the type and arrangement of the surfacing tools.

In practice, the slidable segments 13 are moved outwardly by turning the adjusting bolts 15. This permits the large central glass blank 30 to be easily placed within its recess 19. After the blank lies flat within the recess the slidable segments are moved inwardly sufficiently far to allow clearance between the inside edge of side pieces 22 attached thereto, and the adjacent edges 32 of the blank 30. The glass blanks 29 are then placed freely within their recess 20 in the slidable segments 13. These blanks 29 are cut slightly smaller in size than the recesses so as to have sufficient clearance between their edges and the sidewalls of the recesses. The apparatus is then ready for operation.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In sheet glass surfacing apparatus, a sheet glass supporting table having a central sheet receiving recess and a plurality of surrounding recesses for receiving individual sheets of glass, and means for varying the size of the central sheet receiving recess.

2. In sheet glass surfacing apparatus, a glass supporting table, a central sheet supporting member carried by the table, and a plurality of horizontally adjustable recessed members surrounding said central member for receiving individual sheets of glass, said surrounding members extending above said central member to define a central sheet glass receiving recess thereupon.

3. In apparatus for surfacing sheet glass, a continuously rotatable work table, and a plurality of horizontally adjustable members carried upon the top thereof, said members being provided with individual recesses for receiving individual sheets of glass to be acted upon simultaneously and further cooperating to form the side walls of a glass holding recess therebetween.

4. In sheet glass surfacing apparatus, a work table, and a plurality of glass supporting members carried upon the top thereof, said members being arranged to define a central sheet receiving recess upon the table and being also provided with individual recesses for receiving separate sheets of glass therein.

5. In sheet glass surfacing apparatus, a continuously rotatable work table, and a plurality of horizontally adjustable segments carried upon the top thereof, said segments being arranged to form a central sheet receiving recess upon the table and being also provided with individual recesses for receiving separate sheets of glass therein.

6. In sheet glass surfacing apparatus, a glass supporting table, a central sheet supporting member carried by the table, and a plurality of recessed members surrounding said central member for receiving individual sheets of glass, said surrounding members extending above said central member to define a central sheet glass receiving recess thereupon.

Signed at Toledo, in the county of Lucas, and State of Ohio, this 26th day of August, 1925.

JOSEPH P. CROWLEY.